United States Patent Office

PTO - BOYERS, PA Duty Station

MISSING PAGE TEMPORARY NOTICE

PATENT # 6784X FOR ISSUE DATE 10-4-1831 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings.

Data Conversion Operation

Boyers, Pa

6784x

United States Patent Office.

WILLIAM BLACK, OF ANNE ARUNDEL COUNTY, MARYLAND.

IMPROVEMENT IN PLOWS.

Specification forming part of Letters Patent dated October 4, 1831.

*To all whom it may concern:*

Be it known that I, WILLIAM BLACK, of Anne Arundel county, State of Maryland, have made a new and useful Improvement in Plows, which is described as follows.

The mold-board, share, beam, and handles are made in the usual manner. The improvement for which I ask an exclusive privilege by Letters Patent consists in adding to the common plow a cutter of a peculiar form. This cutter is composed of metal, forming an obtuse angle on its back, and on its front or cutting edge a segment of a circle. Its lower side, resting on the forward part of the share, is about six inches long, and the side secured to the mold-board is about eight inches. Through the cutter, near the back, are two openings for screw-bolts. A mortise eight inches long, one and a half inch broad, and five-eighths of an inch deep is made in the front of the mold-board to receive this cutter. Two openings corresponding to those in the cutter are made in the front of the mold-board to receive the screw-bolts securing the cutter to the mold-board.

For a further illustration of my invention I refer to the model and drawing deposited in the Patent Office.

In testimony whereof I have hereunto subscribed my name, in the presence of two witnesses, this 19th day of September, 1831.

WILLIAM BLACK.

Witnesses:
WM. P. ELLIOT,
EBEN J. HUME.